US009357553B2

(12) United States Patent
Scarr et al.

(10) Patent No.: US 9,357,553 B2
(45) Date of Patent: May 31, 2016

(54) METHODS OF ANALYZING A CELLULAR NETWORK (71) Applicants: Vodafone IP Licensing Limited, Newbury, Berkshire (GB); International Business Machines Corporation, Armonk, NY (US)

(72) Inventors: Kevin Tristan Scarr, Newbury (GB); David Pollington, Newbury (GB); Nichola Jane Inglis Hickman, Newbury (GB); Damian Frederick Brennan, Winchester (GB); Daniel Richard Mays, Winchester (GB)

(73) Assignees: Vodafone IP Licensing Limited, Newbury, Berkshire (GB); International Business Machines, Armonk, NY (US)

( * ) Notice: Subject to any disclaimer, the term of this patent is extended or adjusted under 35 U.S.C. 154(b) by 736 days.

(21) Appl. No.: 13/725,588

(22) Filed: Dec. 21, 2012

(65) Prior Publication Data
US 2013/0183996 A1 Jul. 18, 2013

(30) Foreign Application Priority Data

Dec. 21, 2011 (GB) .................................. 1121955.7

(51) Int. Cl.
*H04W 72/00* (2009.01)
*H04W 72/04* (2009.01)
(Continued)

(52) U.S. Cl.
CPC .......... *H04W 72/0486* (2013.01); *H04W 16/04* (2013.01); *H04W 24/08* (2013.01); *H04W 36/22* (2013.01)

(58) Field of Classification Search
CPC .......... G08G 1/0104; G08G 1/096716; G08G 1/096741; G08G 1/096844; G01C 21/3492; G01C 21/34; H04W 4/046; H04W 4/02; H04W 4/206
USPC .................. 455/453, 450, 452.1; 370/329
See application file for complete search history.

(56) References Cited

U.S. PATENT DOCUMENTS 6,125,278 A  9/2000  Wieczorek et al.
6,650,948 B1  11/2003  Atkinson et al.
(Continued)

FOREIGN PATENT DOCUMENTS

EP  2403290 A1  1/2012
GB  2481715 A  1/2012
(Continued)

OTHER PUBLICATIONS

European Search Report for 12275214.0 dated May 4, 2013.
(Continued)

*Primary Examiner* — Danh Le
(74) *Attorney, Agent, or Firm* — Workman Nydegger (57) ABSTRACT

A method of managing a load within a cellular network. The method includes obtaining network usage records from the cellular network; extracting cell information from the network usage records; establishing terminal carrier routes for cellular terminals that have changed location as determined from the extracted cell information; deriving terminal carrier profile attributes for the cellular terminals that have changed location, based on the established terminal carrier routes; determining a load on a resource of the cellular network, based on the established terminal carrier routes and the derived terminal carrier profile attributes; and controlling resources of the cellular network in response to the determined load, so as to manage the load within the cellular network. By combining established terminal carrier routes with derived terminal carrier profile attributes, it is possible to anticipate areas where cellular terminal carriers are likely to be concentrated at specific times during the day and allocate resources accordingly.

13 Claims, 6 Drawing Sheets (51) Int. Cl.
*H04W 16/04* (2009.01)
*H04W 24/08* (2009.01)
*H04W 36/22* (2009.01)

(56) References Cited

U.S. PATENT DOCUMENTS

| | | | |
|---|---|---|---|
| 7,546,128 B2 | 6/2009 | Smith et al. | |
| 2005/0079878 A1 | 4/2005 | Smith et al. | |
| 2005/0190747 A1* | 9/2005 | Sindhwani | H04W 88/06 370/352 |
| 2005/0216382 A1* | 9/2005 | Chambers | G06Q 30/04 705/34 |
| 2013/0258857 A1* | 10/2013 | Bidare | H04W 28/08 370/237 |
| 2015/0032366 A1* | 1/2015 | Man | G08G 1/095 701/412 |

FOREIGN PATENT DOCUMENTS

| | | |
|---|---|---|
| WO | WO 00/07384 | 2/2000 |
| WO | WO01/01367 | 1/2001 |

OTHER PUBLICATIONS

Utpal Paul et al: "Understanding traffic dynamics in cellular data networks", INFOCOM, 2011 Proceedings IEEE, IEEE, Apr. 10, 2011, pp. 882-890, XP031953661, DOI:10.1109/INFCOM.2011. 5935313 ISBN: 978-1-4244-9919-9 *abstract* *p. 882-p. 884* *p. 889*.

Kari Laasonen Ed—Alipiom Jorge et al: "Clustering and Prediction of Mobile User Routes from Cellular Data", Jan. 1, 2005, Knowledge Discovery in Databases: PKDD 2005 Lecture Notes in Computer Science;Lecture Notes in Artificial Intelligence;LNCS, Springer, Berlin, DE, pp. 569-576, XP019021321, ISBN: 978-3-540-29244-9 *abstract* section 3.

Saravanan M et al: "Route detection and mobility based clustering" Internet Multimedia Systems Architecture and Application (IMSAA), 2011 IEEE 5th International Conference on, IEEE, Dec. 12, 2011, pp. 1-7, XP032123576, DOI: 10.1109/IMSAA.2011. 6156372 ISBN: 978-1-4577-1329-3 the whole document.

Jha S et al: "Location Estimation and Trajectory Prediction for Cellular Networks With Mobile Base Stations", IEEE Transactions on Vehicular Technology, IEEE Service Center, Piscataway, NJ, US, vol. 53, No. 6, Nov. 1, 2004, pp. 1903-1913, XP011122467, ISSN: 0018-9545, DOI: 10.1109/TVT.2004.836967.

GB Search Report for GB1121955.7 dated May 3, 2012.

\* cited by examiner

METHODS OF ANALYZING A CELLULAR NETWORK

CROSS REFERENCE TO RELATED APPLICATIONS

This application claims priority to United Kingdom Application Number 1121955.7, filed on Dec. 21, 2011, the entirety of which is incorporated herein by reference.

FIELD OF THE INVENTION

The present invention relates to methods of extracting and analysing data from cellular networks, and more particularly, using the extracted information, to establishing a likelihood of one or more cellular terminal carriers travelling to a predetermined location, and managing a load within the cellular network.

BACKGROUND OF THE INVENTION

Traffic planners often want to know the impact of events on city infrastructure, event managers often want to target their marketing to maximise the return on investment of their marketing budget, and individuals often want to know what events they would enjoy attending. Data that could be used to predict who will go to a certain place at a certain time is only available for a small sub-set of people, e.g. captured through surveys, customer details from tickets sales, or on web 2.0 location-based service applications where users can 'check in', or rate locations.

Mobile operators may collect network usage records (NUR) that contain information about call events, including telephone calls, SMS and mobile data retrieval. Usage of mobile phones and demographics has already been used to predict attendance at events, such as whether a mobile phone customer will churn (cancel their contract). Call detail records (e.g. ID, cell, and date and time) for mobile phone events have been used to infer home location and attendance at events; see, for instance, "*The geography of taste: analyzing cell-hone mobility and social events*", F Calabrese et al, International Conference on Pervasive Computing, Helsinki, Finland, 2010, which deals with the analysis of crowd mobility during special events.

However, the sole use of home location as a parameter for determining attendance of an event results in poor accuracy of the prediction measurement. Home location is furthermore an inferior parameter for use in estimating the attendance of an event, as it only characterises the relative distance between the customer and the event. There is therefore a need to improve the accuracy and reliability with which the attendance of an event can be predicted, and in a broader sense the likelihood of cellular terminal carriers travelling to a predetermined location.

Additionally, large volumes of mobile phone subscribers located within a certain area and at a certain time of day often place heavy loads on the local telecommunications infrastructure. For instance, a lack of cellular base stations in the general vicinity of an event may limit the capability of the subscribers to initiate mobile events, such as placing calls or browsing the internet. Moreover, the power being delivered to cellular base stations in the vicinity of an event attended by many mobile phone subscribers may be insufficient to cater for all of the subscribers, and bandwidth may as a result be severely limited. There is therefore a need to more rapidly and more efficiently manage the load within a cellular network.

The invention described herein addresses these and other problems found in the prior art.

SUMMARY OF THE INVENTION

In a first aspect of the present invention, there is provided a method of establishing a likelihood of one or more cellular terminal carriers travelling to a predetermined location, using cellular network data. The method comprises the steps of: obtaining network usage records from a cellular network; extracting cell information from the network usage records; establishing terminal carrier routes for cellular terminals that have changed location as determined from the extracted cell information; deriving terminal carrier profile attributes, based on the established terminal carrier routes; and establishing the likelihood of one or more cellular terminal carriers travelling to the predetermined location, based on the established terminal carrier routes and the derived terminal carrier profile attributes.

In particular, one example of establishing a likelihood of one or more cellular terminal carriers travelling to a predetermined location is the prediction of attendance of an event by one or more cellular terminal carriers. Events may include, but are not limited to, sports games, festivals, music concerts, demonstrations, etc. In particular, events include any social gathering which is likely to attract a large number of individuals, particularly when concentrated in an urban environment.

A cellular terminal is typically a mobile telecommunications device, such as a mobile phone, but could also include PDAs, laptop computers, or any other portable device that may communicate with the network. A cellular terminal carrier (or simply a terminal carrier) may be a customer of the cellular network (e.g. a regular user of the network who is registered with the network service provider, for example). Alternatively, a cellular terminal carrier may be a user who is registered with another cellular network.

Thus, based not only on knowledge of a cellular terminal carrier's distance between their home and work locations, but also on the particularities of the various routes they take during the week, one may obtain a more accurate likelihood of a cellular terminal carrier travelling to a predetermined location, such as the likelihood of the terminal carrier attending an event. A single cellular terminal carrier may be associated with multiple terminal carrier routes. This could depend, for example, on the day of the week in which the terminal carrier route is established. A single terminal carrier route may also be associated with a plurality of terminal carrier profile attributes (e.g. one characterising their favoured mode of transport, another characterising their propensity to travel far from home).

By combining a terminal carrier route with one or more terminal carrier profile attributes, a more precise and accurate inference of the likelihood of the cellular terminal carrier travelling to a predetermined location, or attending an event, may be obtained. For example, a first cellular terminal carrier may have their home location at a great distance from an event, whilst a second cellular terminal carrier may live in close proximity of the event. However, if the first cellular terminal carrier, based on their terminal carrier profile attribute (or attributes), has a higher propensity to travel further in order to reach a given destination, whilst the second cellular terminal carrier rarely travels far from home, both cellular terminal carriers may nonetheless have similar likelihoods of attending the event, despite the large difference in their relative proximity to the event. The method may thus take into account many contributory factors, based on a cellular terminal carrier's terminal carrier route(s), each of which may influence the likelihood of attendance. A more accurate map or picture of the likely attendance of an event (or likelihood to travel to a predetermined location), by a multitude of cellular terminal carriers, can therefore be obtained.

Optionally, the extracted cell information includes cellular base station identifiers, and the step of establishing terminal carrier routes further comprises determining changes in the cellular base station identifiers during mobile events. A cellular base station identifier may include not only an identifier of the base station itself, but also a cellular base station location identifier, which identifies the particular location of the base station within the cellular network (e.g. latitude and longitude).

Optionally, a terminal carrier profile attribute may be selected from one or more of the list consisting of: a volume of mobile events along a terminal carrier route; a type of mobile events along a terminal carrier route; a length of a terminal carrier route; a length of time spent at an endpoint of a terminal carrier route; a number of visits to an endpoint of a terminal carrier route, during a predetermined period of time; a distribution of endpoints of a terminal carrier route; and one or more modes of transport used by the cellular terminal carrier. A cellular terminal carrier may therefore be characterised using various different terminal carrier profile attributes. Furthermore, because a cellular terminal carrier may have different routes over a certain period of time (e.g. one working week), it is advantageous to employ various criteria when deriving terminal carrier profile attributes.

Optionally, the one or more modes of transport may be derived by matching at least a portion of the terminal carrier route with one or more predetermined transport routes. Matching at least a portion of the terminal carrier route may comprise comparing the locations of cellular base stations as determined by the extracted cell information with the one or more predetermined transport routes. The terminal carrier profile attribute may also be a function of whether the one or more modes of transport is a mode of public transport. By determining the different modes of transport a cellular terminal carrier takes, a more precise terminal carrier profile attribute may be derived. For example, if the terminal carrier route is largely matched with predetermined train routes, then it may be inferred that the cellular terminal carrier is more likely to take a train to travel to a predetermined location (e.g. attend an event), and may therefore be more likely to attend events far removed from their home location.

Optionally, the network usage records span a predetermined time period, such as twenty-four hours, for example.

Optionally, at least one of the terminal carrier profile attributes may be a function of the location of the most common endpoint of a respective terminal carrier route, as determined when the respective terminal carrier route is established using network usage records spanning a first time period and using network usage records spanning a second time period. The word "function", in this sense, means that the terminal carrier profile attribute may be adjusted or else may vary as the respective terminal carrier route (or routes) changes. An endpoint that is visited multiple times when compared to other endpoints of the route may, for instance, suggest that the cellular terminal carrier is more likely to attend an event close to said endpoint, and this may be reflected in the corresponding terminal carrier profile attribute(s).

Optionally, the step of deriving terminal carrier profile attributes may comprise calculating a radius of gyration of an endpoint of a terminal carrier route as calculated using network usage records spanning a first time period and using network usage records spanning a second time period. The radius of gyration is a useful parameter for characterising a cellular terminal carrier's propensity to travel further from home.

Optionally, the mobile events may be selected from the group consisting of: call; SMS; cell change; MMS; USSD; IMSI; and data download.

Optionally, the network usage records are real-time, near real-time or stored data. A combination of real-time and stored data helps one derive more accurate terminal carrier profile attributes.

Optionally, the method further comprises the step of determining whether a cellular terminal carrier travels to the predetermined location during a predetermined time period, using the cell information extracted from network usage records spanning the predetermined time period. For example, the method may comprise determining whether the cellular terminal carrier attends an event, using the extracted cell information at the time of the event. This information may be used in later predictions of the likelihood of attendance of events.

For instance, if it is predicted that 10% of a cellular terminal carrier base will attend an event, and if it is later confirmed that, of those 10%, 90% attended that event, then the terminal carrier profile attributes of those 90% may be adjusted to indicate a higher likelihood of those 90% attending a later event in the same location. Furthermore, a terminal carrier's terminal carrier profile attribute may be adjusted based on the existence of other terminal carriers having similar terminal carrier profile attributes and/or for whom similar terminal carrier routes have been established. For example, it may be known that terminal carriers with a certain type of terminal carrier profile attribute possess well-established terminal carrier routes for attending a certain event. It may therefore be inferred that other terminal carriers with similar terminal carrier profile attributes are more likely to attend that event. The likelihood may be adjusted accordingly depending on the terminal carrier route established for those other terminal carriers.

Optionally, the step of establishing the likelihood of one or more cellular terminal carriers travelling to the predetermined location may comprise using the established terminal carrier routes and the derived terminal carrier profile attributes as inputs for decision trees (such as CHAID), logistic regression and/or neural nets.

In a second aspect the present invention, there is provided a method of managing a load within a cellular network. The method comprises the steps of: obtaining network usage records from the cellular network; extracting cell information from the network usage records; establishing terminal carrier routes for cellular terminals that have changed location as determined from the extracted cell information; deriving terminal carrier profile attributes, based on the established terminal carrier routes; determining a load on a resource of the cellular network, based on the established terminal carrier routes and the derived terminal carrier profile attributes; and controlling resources of the cellular network in response to the determined load, so as to manage the load within the cellular network. The step of determining the load may comprise calculating a likelihood of a concentration of cellular terminal carriers forming at a location.

By combining established terminal carrier routes with derived terminal carrier profile attributes, it is possible to anticipate areas where cellular terminal carriers are likely to be concentrated at specific times during the day. As a result, the load on certain resources of the cellular network, and at specific locations, can be estimated, and the resources of the network can be balanced/redistributed, or otherwise controlled, accordingly. For example, when a major event (such as a large music festival) is taking place within a city centre, based on terminal carrier routes and terminal carrier profile attributes, one may determine the likelihood of a large number of cellular terminal carriers attending the festival, and may thus estimate a load on the network in the vicinity of the festival. The network resources that are available during the festival may be controlled in response to the determined load.

Optionally, the extracted cell information includes cellular base station identifiers, and the step of establishing terminal carrier routes further comprises determining changes in the cellular base station identifiers during mobile events. A cellular base station identifier may include not only an identifier of the base station itself, but also a cellular base station location identifier, which identifies the particular location of the base station within the cellular network (e.g. latitude and longitude).

Optionally, the step of controlling resources of the cellular network comprises balancing resources of the cellular network. For example, in areas where a load is determined to be low, resources in such areas may be redistributed to other areas where a load is estimated to be great such that it places strain upon the resources available in those other areas. Redistribution of network resources in this manner may ensure that resources are efficiently used when needed, and not wasted when they could be put to use in areas that require them.

Optionally, a resource may be selected from one or more of the list consisting of: a number of cellular base stations within a predetermined area; a bandwidth on which a cellular base station may transmit and/or receive; and a power supplied to a cellular base station. There may be other resources of the network, such as the number of back-end servers being used, for example.

Optionally, each terminal carrier route has a plurality of endpoints, and the step of determining the load may comprise establishing the number of endpoints within a predetermined area. A greater number of endpoints within an area may be indicative of a higher likelihood of cellular terminal carriers attending events or otherwise being present in the area. This information may be used to assist in more accurately determining the load on a resource of the network.

Optionally, the step of controlling resources of the cellular network comprises modifying the number of cellular base stations within a predetermined area. The step of controlling resources of the cellular network may also comprise modifying the power supplied to at least one cellular base station. Modifying the power may comprise diverting power from at least one other cellular base station to the at least one cellular base station. Optionally, the step of controlling resources of the cellular network comprises modifying the bandwidth on which at least one cellular base station may transmit and/or receive. For example, the bandwidth on which a cell base station transmits and/or receives may be increased if a load is determined to increase at a certain point in time, perhaps during a major city event. Similarly, the number of cellular base stations in the area may be increased or altered.

Optionally, the mobile events may be selected from the group consisting of: call; SMS; cell change; MMS; USSD; IMSI; and data download.

Optionally, the network usage records are real-time, near real-time or stored data. A combination of real-time and stored data may help derive more accurate terminal carrier profile attributes.

The methods described above may be implemented as a computer program comprising program instructions to operate a computer. The computer program may be stored on a computer-readable medium. Furthermore, the method may be implemented as a computer program operating on a computer system such as a network, server or group of servers with suitable memory storage and database resources.

It should be noted that any feature described above may be used with any particular aspect or embodiment of the invention.

BRIEF DESCRIPTION OF THE DRAWINGS

The present invention may be put into practice in a number of ways and embodiments will now be described by way of example only, and with reference to the accompanying drawings in which.

DETAILED DESCRIPTION OF PREFERRED EMBODIMENTS

Figure 1:
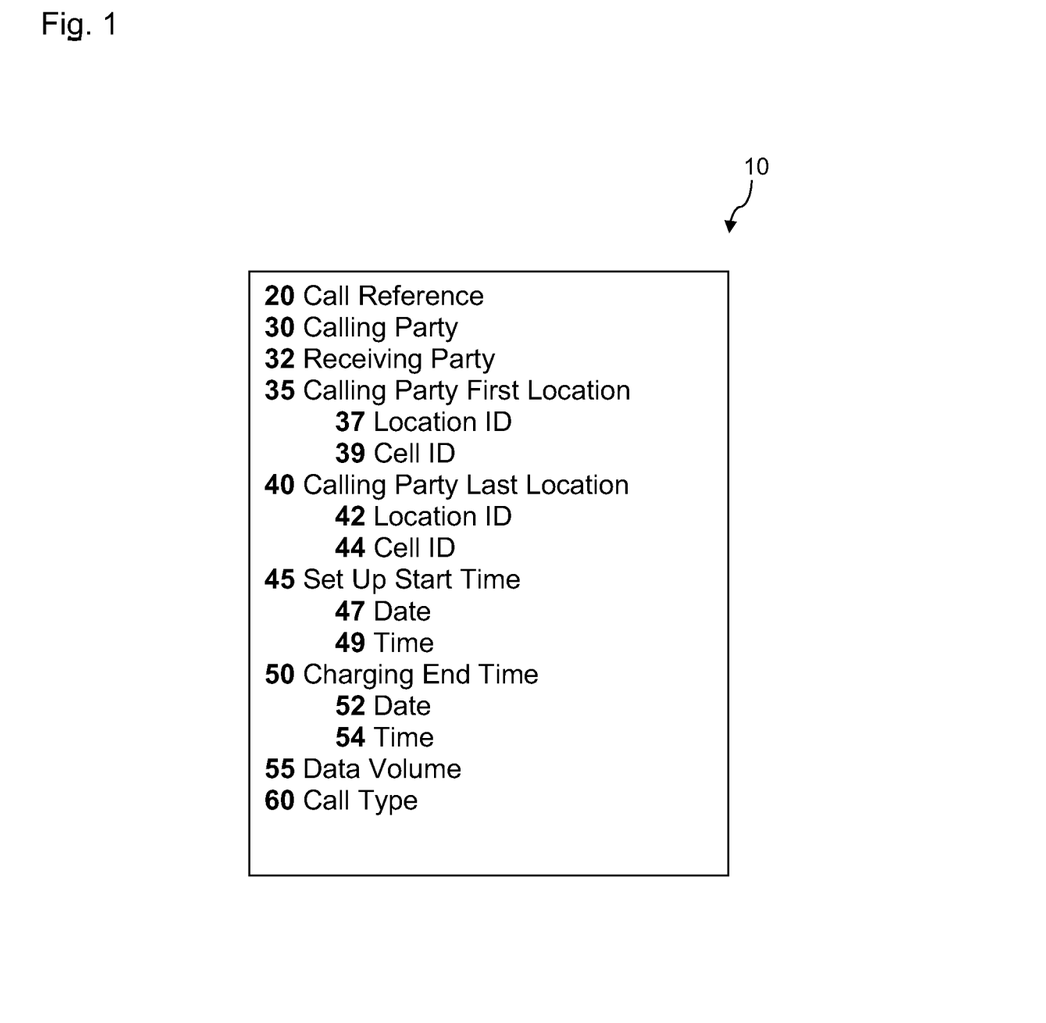
FIG. 1 shows an example file structure of a network usage record.

FIG. 1 shows an exemplary file structure of network usage records (NUR) 10 indicating some of the data fields that may be present in such a record. Other data fields may be present or the data fields may have different names or structure. NUR may be records that describe how a network element such as a switch, for example, handles an event (such as a call). The NUR data may include information about where the call was initiated and terminated, its duration, and the parties (or telephone numbers) involved in the particular event. Amongst other things, the NUR may contain information necessary to enable a user to be correctly billed.

In the present embodiment, the call reference 20 provides an identifier for the NUR. The calling party 30 is an identifier for the mobile device and may be the device's or SIM's telephone number, for example. The receiving party field 32 indicates the destination of the call. The calling party first location 35 contains two subfields 37 and 39 indicating the location ID and cell ID specifying details of where the call is initiated. Similarly, the calling party last location 40 contains two subfields 42 and 44 specifying the location ID and cell ID of where the call was terminated. Where the calling party is moving between cells during a call, the first location and last location may be different. The set up start time 45 contains subfields date 47 and time 49. Charging end time 50 defines the date 52 and time 54 at the end of the call. Data volume 55 indicates how much data was transmitted and/or received, if the call was a data call. Such a field may be absent or blank for non-data calls. Field 60 describes the call type which may be a voice call, an SMS or a data transfer, for example. Other call types may be included.

Although the term "call" has been used, this may be a generic term to describe an event that may occur or be provided to a mobile device such as a cell phone. Other events may be stored within NUR data. For example, an active mobile device moving between cells may have this handover recorded even though no call is made during this handover.

Nevertheless, such an event or set of events may be used to determine the location and speed of a particular mobile device. Furthermore, average journey times for particular routes or sets of routes may be determined from analysing many events, as recorded in NUR data.

Where the calling party first location 35 and calling party last location 40 are different locations, then this indicates that the mobile device has moved during the call. In addition to the first and last locations, other cell IDs may be stored within the NUR indicating handoff between different cells during the call. The set up start time 45 and charging end time 50 may be used to determine the call duration. As the location IDs typically relate to fixed locations of cell base stations and these may be known from a database of such locations, then the distance travelled during the call by the mobile device (or an estimation of this distance) together with the duration of the call may be used to calculate travel speed or average travel speed during the call. As the density of cells increases, so may the accuracy of the calculated travel speed. However, even for spaced-apart cells a suitable approximation of travel speed may be derived. Under certain circumstances, a mobile device may not use the closest cell. Therefore, certain cells may have different or overlapping coverage and this may be taken into account when determining the location and travel speed of a mobile device. For example, such a situation may be determined when a mobile device hands over between non-neighbouring cells.

Figure 2:
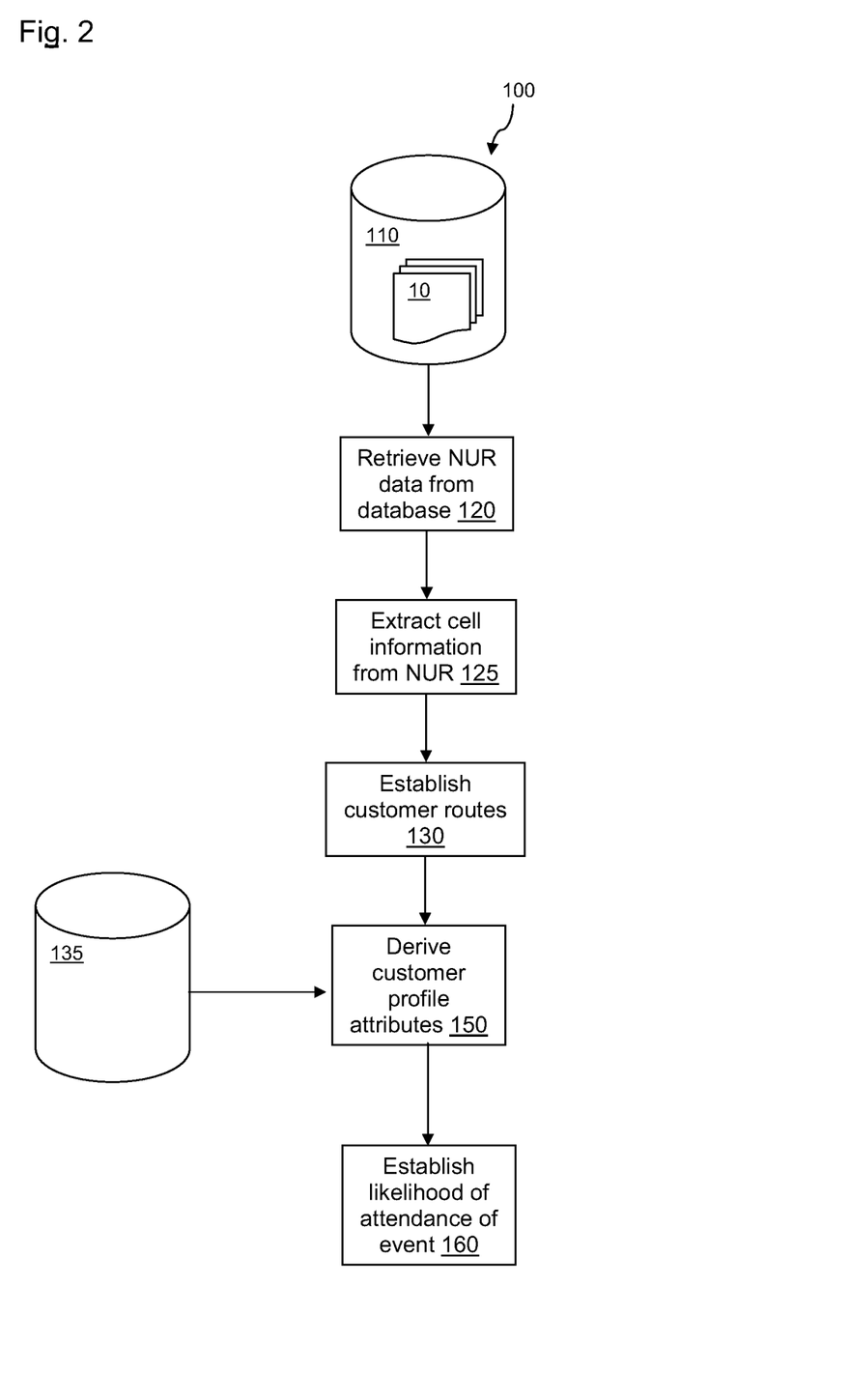
FIG. 2 shows a flowchart illustrating a method of predicting the attendance of an event.

FIG. 2 shows a flowchart of a method 100 for predicting the attendance of an event, according to an embodiment of the invention. This method 100 is illustrated in high-level terms in FIG. 2, which shows only the main steps but does not show particular implementations of the steps, which are shown in detail in further figures. The method may also be used, in more general terms, to establish a likelihood of one or more cellular terminal carriers (e.g. subscribers of the cellular network) travelling to a predetermined location.

A database 110 contains a plurality of network usage records (NUR) 10. This NUR database 110 may be populated by a mobile network or contained within such a network (not shown in this figure). At step 120, NUR data is retrieved from the database 110. Cell information is extracted from the NUR data at step 125. This cell information may include cell ID and/or cell location ID. At step 130, the extracted cell information is used to establish a terminal carrier route, otherwise known as a customer route, or customer journey. This may be done by identifying NURs originating from the handsets of customers moving throughout the cellular network. As a customer moves from one cell to an adjacent cell during a mobile event (e.g. during a call), the handover of the call from a cellular base station in the first cell to a cellular base station in the adjacent cell may be recorded in the NUR data, and this provides an indication of the customer velocity (i.e. speed and direction of travel), allowing the respective route to be established. In other words, a terminal carrier route may be established for cellular terminals (e.g. mobile devices) that have changed location as determined from the extracted cell information. At step 150, one or more terminal carrier profile attributes, also known as customer profile attributes, are derived for any given customer route. The method of deriving the customer journey profile is explained in greater detail below, in conjunction with FIG. 3. At step 160, the likelihood of one or more customers attending an event is established.

Figure 3:
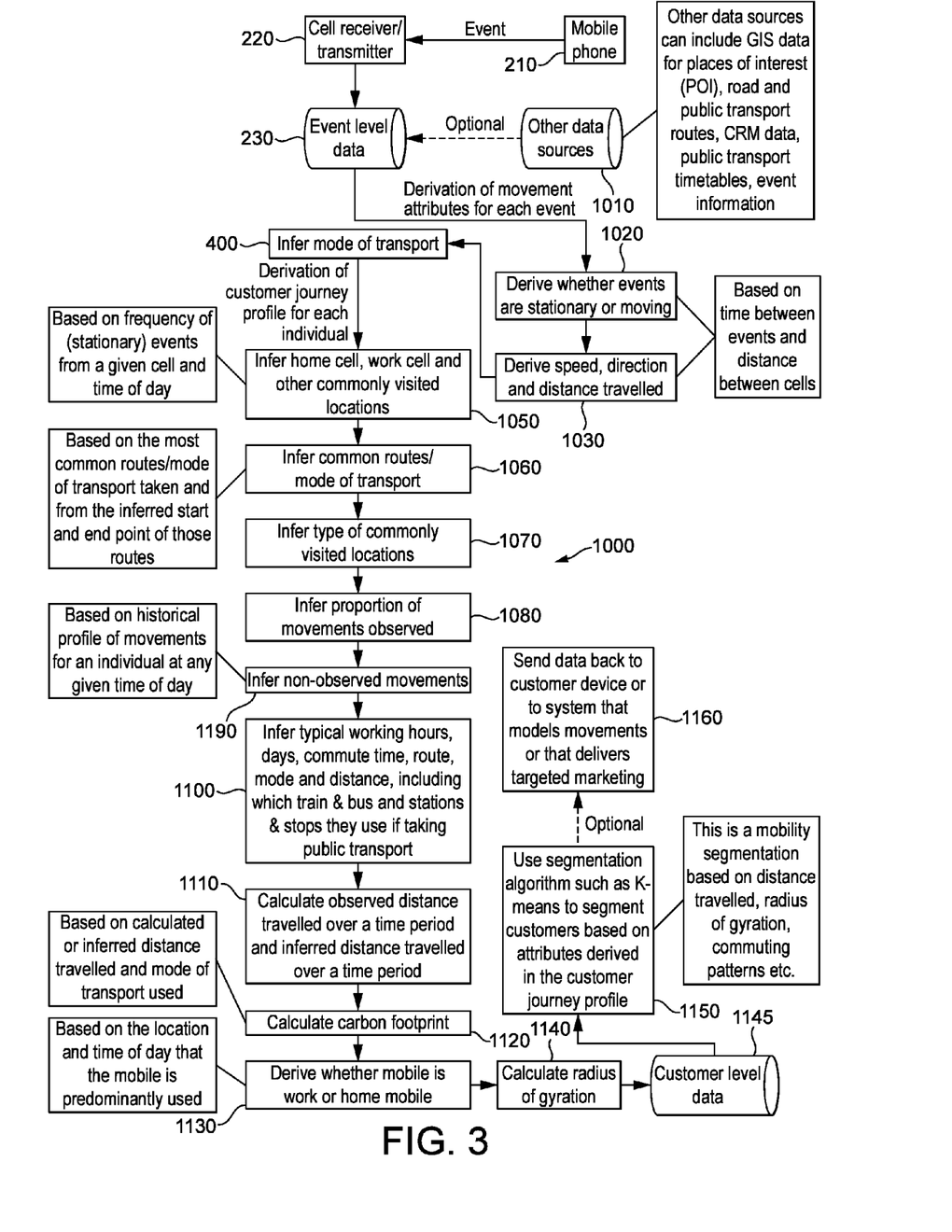
FIG. 3 shows a flowchart illustrating a method of deriving a terminal carrier profile attribute, including an algorithm for inferring a mode of transport.

FIG. 3 shows a flowchart illustrating schematically and in more detail a method for deriving terminal carrier profile attributes, otherwise known as customer profile attributes.

The events generated or relating to a mobile phone 210 are processed by the cell receiver/transmitter 220. The generated live data may be stored in a database 230. This data may be supplemented by other data sources in database 1010. These other data sources may include geographic information system (GIS) data for places of interest (POI), road and public transport routes, customer relationship management (CRM) data, public transport timetables, event information and any other data sources. The NUR data 10 may be analysed to determine whether particular events occurred with the mobile phone 210 being stationary or moving at step 1020. This result may be derived from timing of events and the distance between cells, and whether or not the first cell and last cell are the same or different. For moving events, the speed, direction and distance travelled may be determined at step 1030. From this, the particular mode of transport may be inferred at step 400. Further details of the sub-steps of this inference step are described with reference to FIG. 5. At step 1050, the particular users' home cell, work cell and commonly visited locations may be inferred. This may be based on a frequency of stationary events for a given cell and time of day, for example.

Common routes/modes of transport may be inferred at step 1060. This inference may be based on common or most common routes/modes of transport taken and from calculated start and end points of these particular routes. Commonly visited locations and their types may be inferred at step 1070. The proportion of observed movements may be calculated or inferred at step 1080. Non-observed movements may be inferred at step 1090 and this may be based on historical profiles of movements for individuals at any given times of day. Typical working hours for particular users may be inferred at step 1100. This information may be determined from typical working hours, days, commute time, route, mode and distance.

The total observed distance may be calculated for particular periods of time for users at step 1110. The carbon footprints for particular users or groups of users may be calculated at step 1120 and this may be based on calculated or inferred travel distance and determined modes of transport.

A determination may be made as to whether the mobile device is a work or home mobile, or cell phone at step 1130. Such a derivation may be based on the location and time of day that the mobile device is predominantly or most commonly used. The radius of gyration for particular users may be calculated at step 1140. An example of such a calculation may be found in M Gonzalez, C Hidalgo, and A-L Barabasi, "*Understanding individual human mobility patterns*", Nature, vol. 453, no. 7196, pp. 779-782, 2008.

Thus, a customer journey profile (or customer profile attribute) may be obtained, and allows one to characterise a customer based on their customer route. Step 1150 assigns or calculates users to particular categories based on the inferred or calculated customer profile attributes generated in the previous steps. Additionally, customer level data stored in database 1145 may be used as a further input for such categorisation assignment.

In certain circumstances, the categorisation data may be sent back to the mobile device or to other systems to use such information at step 1160.

As an example of how a customer profile attribute may be derived, locations may be mapped to the extracted cell information for particular events relating to the retrieved NUR data. A database 135 may be used to provide specific locations relating to the extracted cell information so that actual locations may be determined for particular users. This information may be used to determine that particular events related to static calls where the user was not moving during a particular event. This information may be used to determine the movement of a particular user as the first location and the last location may be different. Where a movement occurred, then an inference may be made regarding the mode of transport that was used, and thus the time spent from one endpoint of the customer route to another. A set of movements and user behaviour may be built up to provide an indication relating to the types of users that are making and potentially receiving calls or generating recorded events stored in the database 110.

Any combination, a subset or all of the inference or calculation steps described with reference to FIG. 3 may be used when deriving customer journey profiles. For example, some types of customer profile attributes may use particular inference steps that are not used for others. Furthermore, more than one customer profile attribute may be derived for a given customer and customer route.

Figure 4:
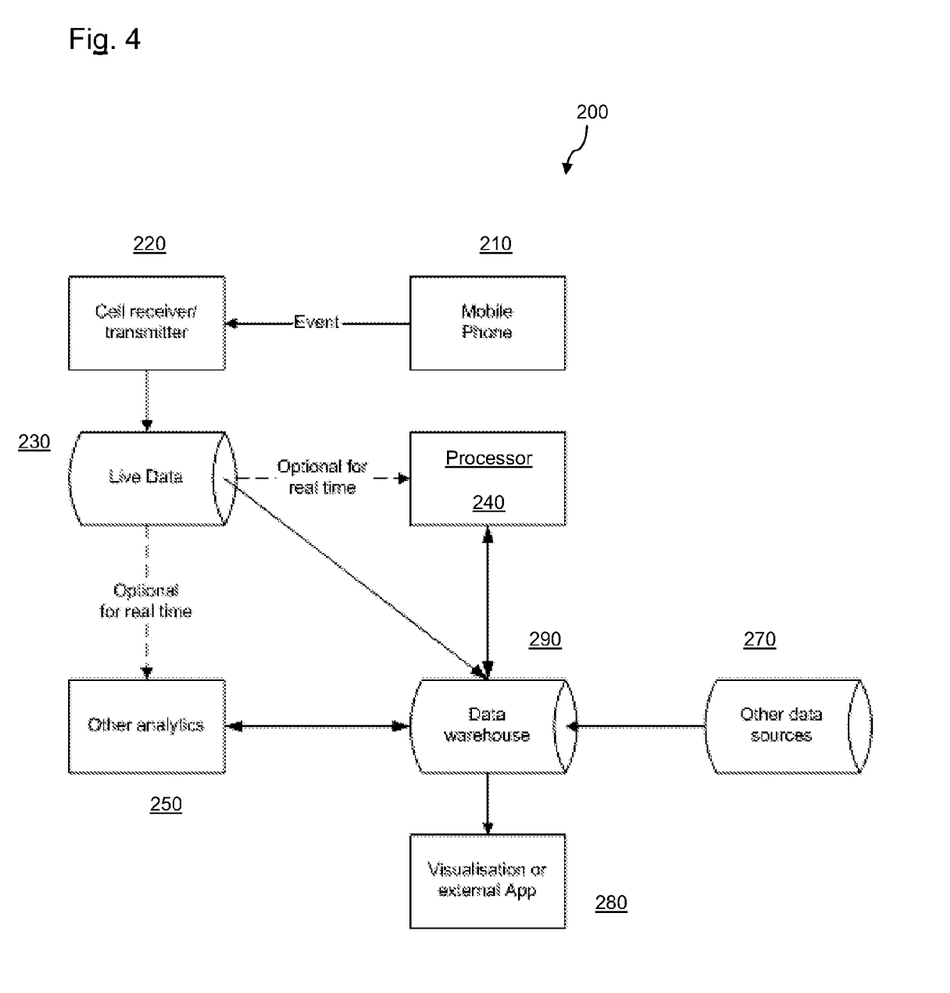
FIG. 4 shows a schematic diagram of a system for carrying out the method of FIGS. 1 and 6.

FIG. 4 shows a schematic diagram of system components used to implement the described methods. These components form a system 200 including a mobile device 210 that may be used to initiate an event by communicating with a base station or cell 220, which generates live data stored on database 230. The live data may be archived in a data warehouse 290. A central processor 240 processes data from database 230 and data warehouse 290 to execute computer programs or algorithms that run the described methods. Additional database 270 may provide additional data that may include transport database 135 (see FIG. 2) to provide specific locations. An additional central processor unit 250 may execute other analytical procedures or algorithms that are not described in detail here. A display unit or output unit 280 may provide visualisation of the method results or provide an application programming interface so that such results may be used by other programs or systems. The processors and databases may be formed from a network or contained within logical or physical servers operating on suitable operating systems such as UNIX, Windows® or Linux, for example. The databases may use Oracle, SQL Server or DB2, for example.

Figure 5:
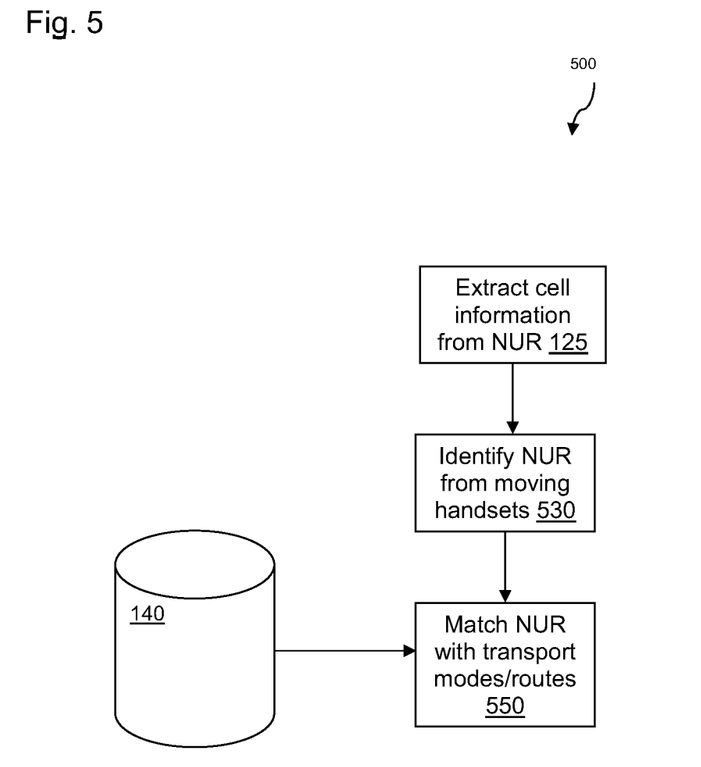
FIG. 5 shows a flowchart of the steps of the algorithm for inferring the mode of transport of FIG. 4.

FIG. 5 shows a flow diagram illustrating the method or algorithm 400 described with reference to FIG. 3 for inferred modes of transport or transport route. The extracted cell information from the NUR records provides the source information. From these records, a subset may be identified that relate to events generated from moving handsets and these are identified at step 530. For example, moving handsets may be determined from those having start and end cells that are different or a large distance apart, and not necessarily neighbouring cells. Database 140 may provide transport data or data relating to particular transport routes and their locations. At step 550, the identified moving handset NUR records may be matched with particular transport modes or routes using the data from database 140. For example, a NUR data record having two or more different cells for a particular event where the cells are placed along a train route and the start and end times of the event indicate that the mobile device was travelling at the speed of a moving train, then such a record may be matched with the particular train route. This information may be used to categorise or provide one or several inputs to the categorisation algorithm 1150 shown in FIG. 3.

As can be seen from the above, customer profile attributes may include any number of parameters that help characterise the customer based on their particular customer route, and may include, but are not limited to: a rating of the customer's mobility; the length of a customer route; the volume of mobile events along a customer route; the type of mobile events along a customer route; the length of time spent at home; the length of time spent at work; the customer's commute distance (e.g. an average of how far the customer travels during weekdays); the customer's leisure distance (e.g. an average of how far the customer travels at weekends); the customer's propensity to travel to new places (e.g. a measure of the variation in customer journey routes over a certain time period); and the customer's propensity to use public transport.

Using the derived customer profile attributes in combination with the customer routes, a more accurate and precise indication of the likelihood of one more customers attending an event (or otherwise travelling to a predetermined location) can be generated. Prediction of the attendance of an event can be achieved using prediction/classification algorithms such as decision trees (e.g. CHAID), logistic regression, neural nets, etc., using the relevant customer profile attribute(s) and customer route(s) as inputs. By running the method for a very large number of customers within a single, large urban environment (for example), a clear indication of the number of individuals likely to attend the event may be obtained.

Using decision trees or logistic regression, etc., it is possible build up a set of rules that, for a given terminal carrier, indicate a probability of the terminal carrier attending a given event (e.g. being in a predetermined location at a predetermined time). By applying this calculation to a very large customer base, it is possible to determine the number of customers that are expected to attend a given event. This data can be compared to the average number of customers that would be expected to attend the event (e.g. based on a historical average), and thus the likely resultant increase/decrease in demand on the network resources can be calculated. Therefore, a more efficient management of network resources can be achieved (see below).

This has many advantages, particularly in urban environments, whereby traffic managers are better placed to anticipate large groups of people descending on a given point at a given, and may prepare in advance for such eventualities. Moreover, the accuracy with which the prediction is calculated is improved at a greater rate than in the prior art, where only knowledge of customers' home location is used. Knowledge not only of the customer routes but also customer route attributes, such as the propensity for the customer to travel long distances, or even the financial standing of the customer (which may be inferred from the mode of transport of the user, or their home or work locations), is directly or indirectly linked to the likelihood of said customers attending an event. An individual's mobility also captures their tolerance to travelling intermediate distances or to places they have not been before. Hence, knowledge of the customer profile attributes is a useful factor for determining the likelihood of a customer attending an event, when compared to simple knowledge of a customer's home location.

By establishing terminal carrier routes and deriving, based on the terminal carrier routes, terminal carrier profile attributes, it is possible to control a load on a resource of the cellular network. This has particular advantages for the efficient management of a city's telecommunications infrastructure, and for the efficient management of cellular networks in general.

When many customers are predicted to be concentrated in a particular location and at a certain point in time, this may place strain on the resource capacity of the local base stations, for instance. Customers may not be able to initiate cell events as a result, such as placing calls or interacting with the internet via their handsets. Knowledge of the likelihood of many customers forming an aggregation or a concentration at a certain location allows one to estimate the actual number of customers at that location at a certain point in time. In anticipation of such concentrations of customers (for example due a large social event), one may rapidly and efficiently manage the load within the cellular network by controlling the resources available to the network.

Figure 6:
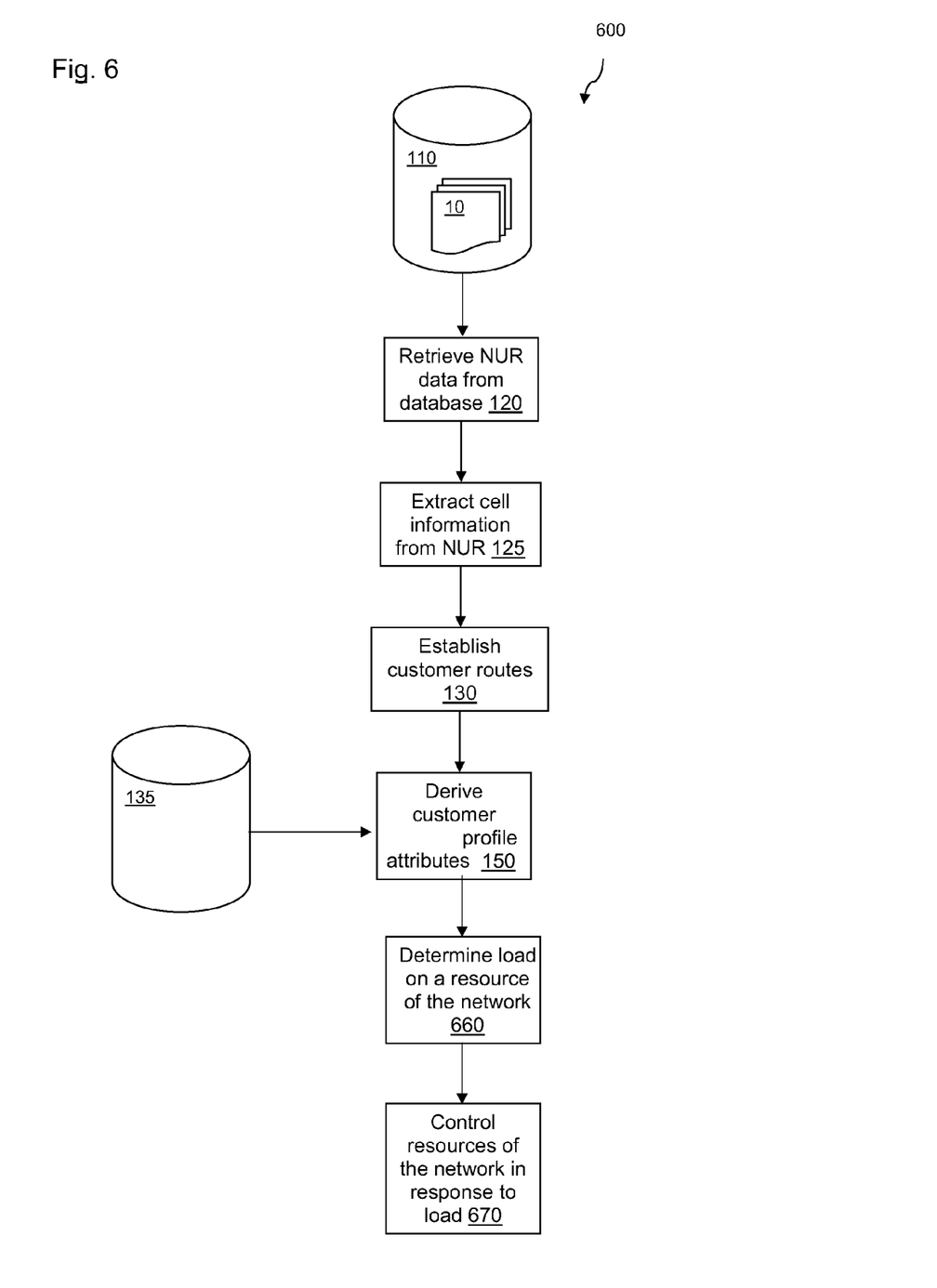
FIG. 6 a flowchart illustrating a method of managing the load within a cellular network.

FIG. 6 is a schematic diagram showing a method 600 allowing one to manage the load within a cellular network. The method is largely similar to that illustrated in FIG. 2 except for steps 660 and 670, wherein a load on a resource of the network is first determined, based on the customer routes and customer profile attributes, and wherein the resources of the cellular network are subsequently controlled, in response to the determined load. Controlling the resources may take many forms, such as, but not limited to: modifying the number of cellular base stations within a predetermined distance of a particular location; modifying the power supplied to the cellular base station(s) in close proximity to a particular location; and diverting power from at least one other cellular base station to the cellular base station(s) in close proximity to a particular location. The bandwidth on which a cell base station receives/transmits information to subscribers' handsets may also be appropriately adjusted. Thus, for example, if many subscribers are estimated to attend a given event, nearby cell base stations may be configured to transmit and receive data using greater bandwidth.

If there are a great many customer route endpoints in close vicinity to an event, for example, the resources of the network may be furthermore appropriately altered or balanced, in view of the fact that many of the endpoints may correspond to customers who may not be attending the event but who nonetheless will be in the vicinity of the event, and who will thus be relying on the base stations in the area.

The system illustrated in FIG. 4 may be adapted to carry out the method of managing the load within a cellular network. In particular, processor 240 may be configured to control the resources of the network in response to a determined load on a particular resource (e.g. a base station) of the network.

As will be appreciated by the skilled person, details of the above embodiments may be varied without departing from the scope of the present invention, which is to be limited only by the appended claims.

For example, the NUR data may contain other information. This may include GPS or other location data obtained from the mobile device and recorded at various stages and times during a call.

NUR data may include call detail records (CDR) generated, recorded and stored for particular events especially related to calls and SMS transmissions. For data events, the NUR data may be xDR records generated for similar purposes. In other words, specific implementations of the methods and systems described throughout may use CDR and/or xDR data as the network usage records. Furthermore, NUR may include event records other than CDR and/or XDR data.

Many combinations, modifications, or alterations to the features of the above embodiments will be readily apparent to the skilled person and are intended to form part of the invention. For example, any of the features described as specifically relating to one embodiment may be used in any other embodiment by making the appropriate changes.

The invention claimed is:

1. A method of managing a load within a cellular network, the method comprising the steps of:
    obtaining network usage records from the cellular network;
    extracting cell information from the network usage records;
    establishing terminal carrier routes for cellular terminals that have changed location as determined from the extracted cell information;
    deriving terminal carrier profile attributes for the cellular terminals that have changed location, based on the established terminal carrier routes;
    determining a load on a resource of the cellular network, based on the established terminal carrier routes and the derived terminal carrier profile attributes; and
    controlling resources of the cellular network in response to the determined load, so as to manage the load within the cellular network.

2. The method of claim 1, wherein the extracted cell information includes cellular base station identifiers, and wherein the step of establishing terminal carrier routes further comprises determining changes in the cellular base station identifiers during mobile events.

3. The method of claim 2, wherein the mobile events are selected from the group consisting of: call; SMS; cell change; MMS; USSD; IMSI; and data download.

4. The method of claim 1, wherein the step of controlling resources of the cellular network comprises balancing resources of the cellular network.

5. The method of claim 1, wherein the step of determining the load comprises calculating a likelihood of a concentration of cellular terminal carriers forming at a location.

6. The method of claim 1, wherein a resource is selected from one or more of the list consisting of: a number of cellular base stations within a predetermined area; a bandwidth on which a cellular base station may transmit and/or receive; and a power supplied to a cellular base station.

7. The method of claim 1, wherein each terminal carrier route has a plurality of endpoints, and wherein the step of determining the load comprises establishing the number of endpoints within a predetermined area.

8. The method of claim 1, wherein the step of controlling resources of the cellular network comprises modifying the number of cellular base stations within a predetermined area.

9. The method of claim 1, wherein the step of controlling resources of the cellular network comprises modifying the power supplied to at least one cellular base station.

10. The method of claim 9, wherein modifying the power comprises diverting power from at least one other cellular base station to the at least one cellular base station.

11. The method of claim 1, wherein the step of controlling resources of the cellular network comprises modifying the bandwidth on which at least one cellular base station may transmit and/or receive.

12. The method of claim 1, wherein the network usage records are real-time, near real-time or stored data.

13. A computer program product comprising one or more non-transitory computer-readable media having thereon computer-executable instructions that are structured such that, when executed by one or more processors of a computing system, configure the computing system to perform a method of managing a load within a cellular network, the method comprising the steps of:
    obtaining network usage records from the cellular network;
    extracting cell information from the network usage records;
    establishing terminal carrier routes for cellular terminals that have changed location as determined from the extracted cell information;
    deriving terminal carrier profile attributes for the cellular terminals that have changed location, based on the established terminal carrier routes;
    determining a load on a resource of the cellular network, based on the established terminal carrier routes and the derived terminal carrier profile attributes; and
    controlling resources of the cellular network in response to the determined load, so as to manage the load within the cellular network.

* * * * *